United States Patent Office 2,768,666
Patented Oct. 30, 1956

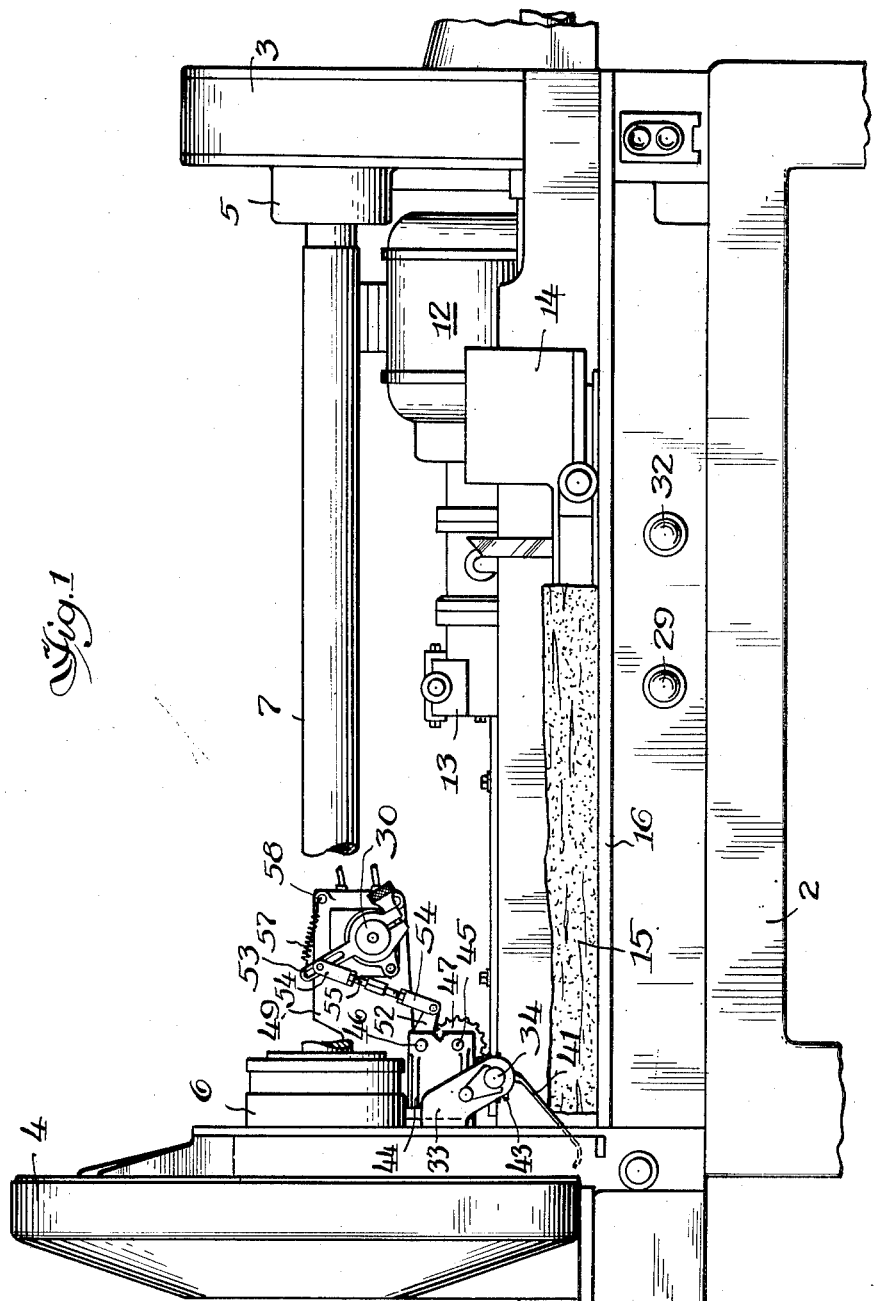

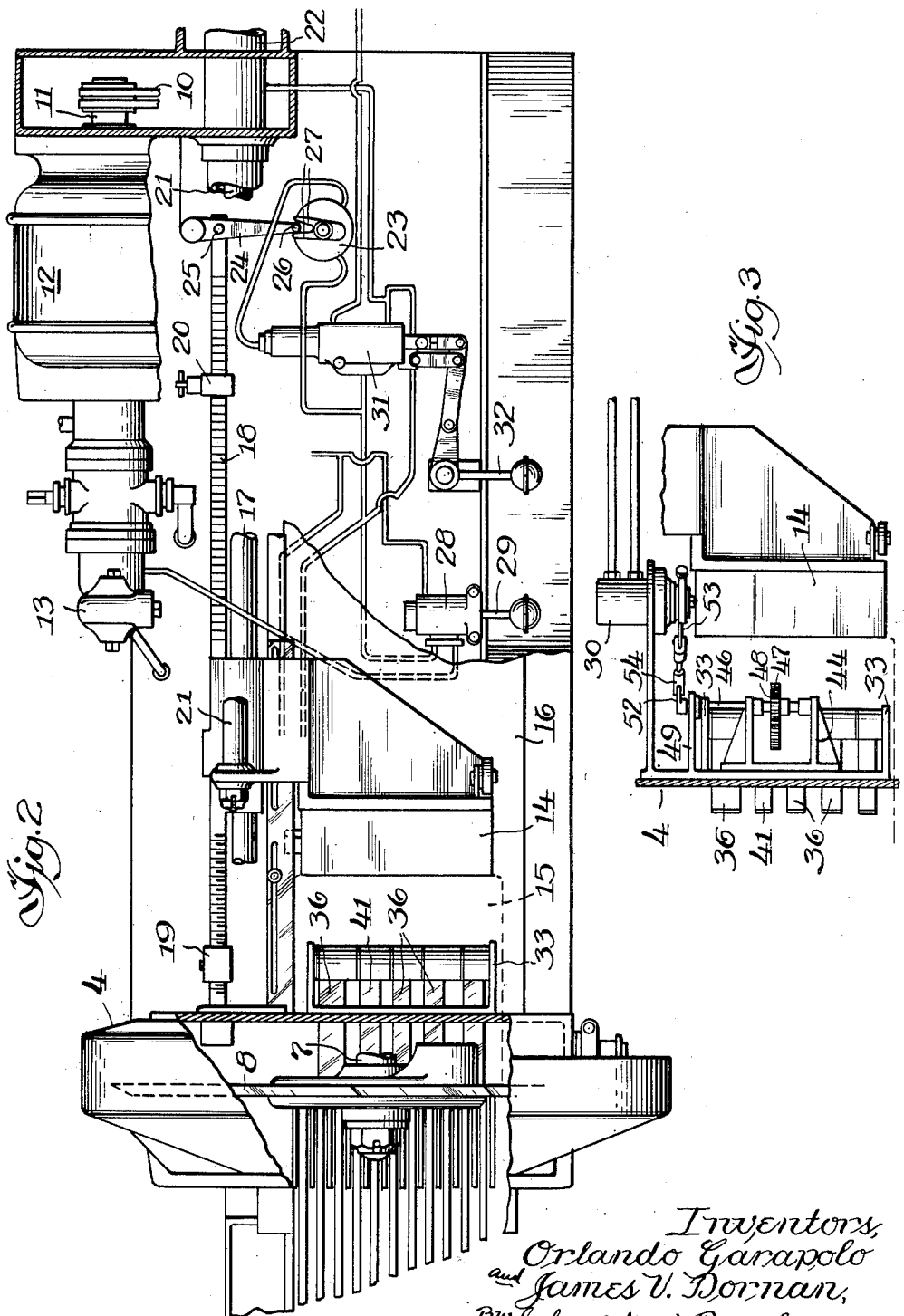

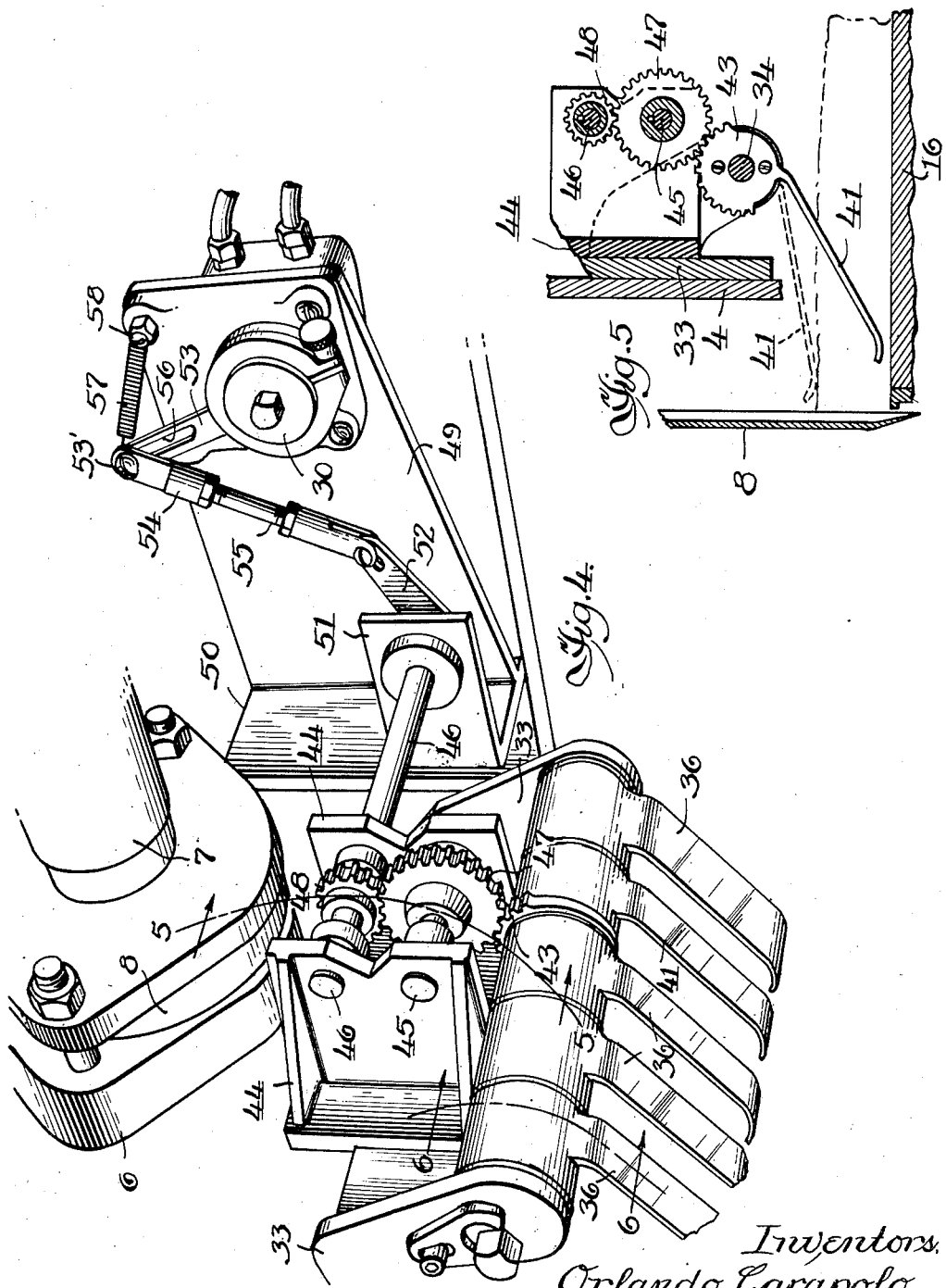

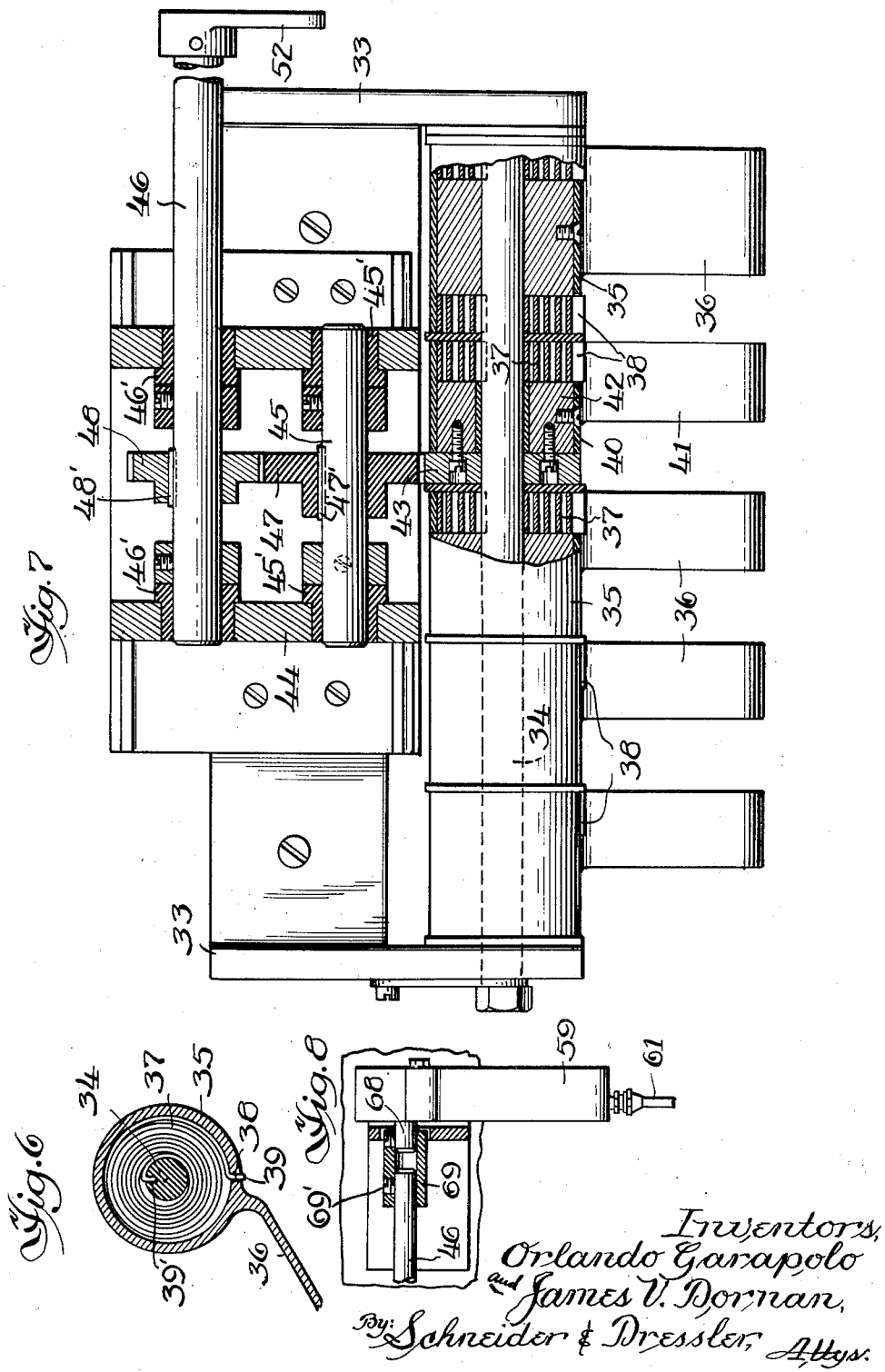

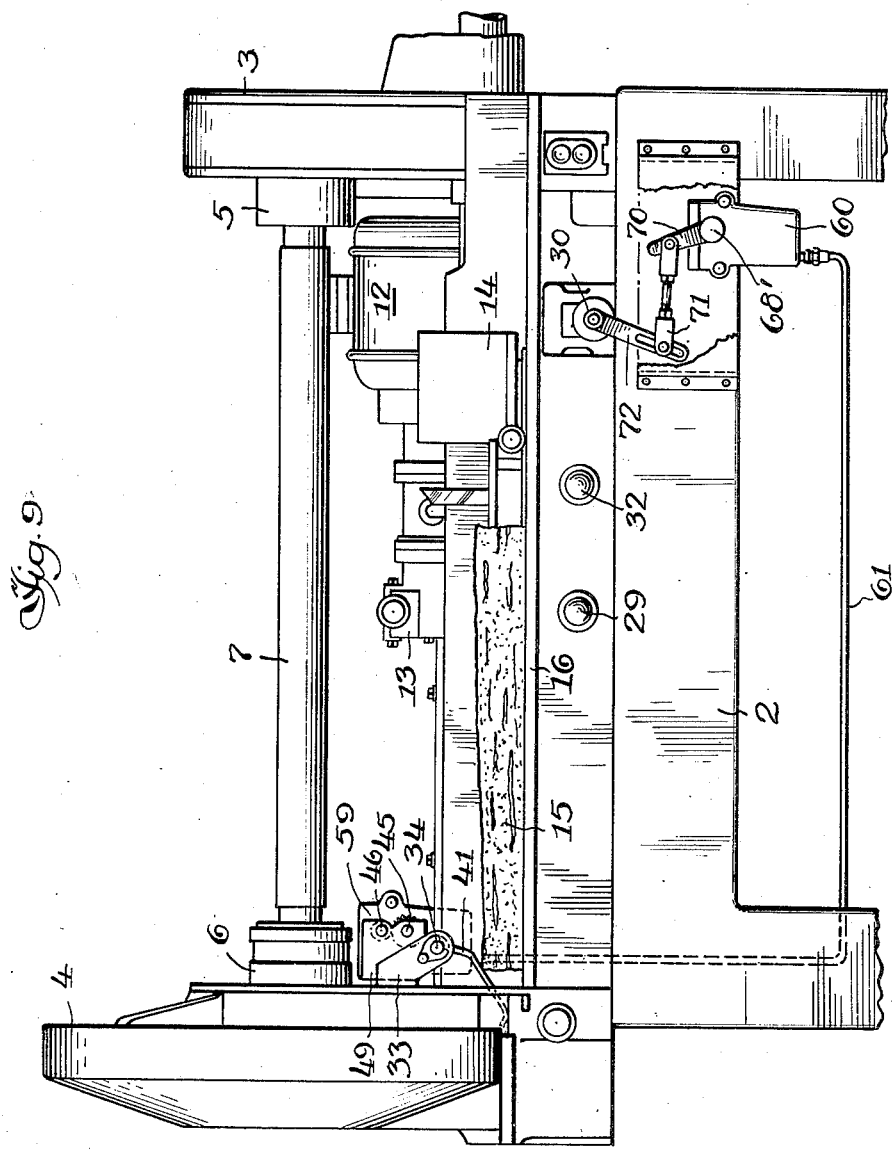

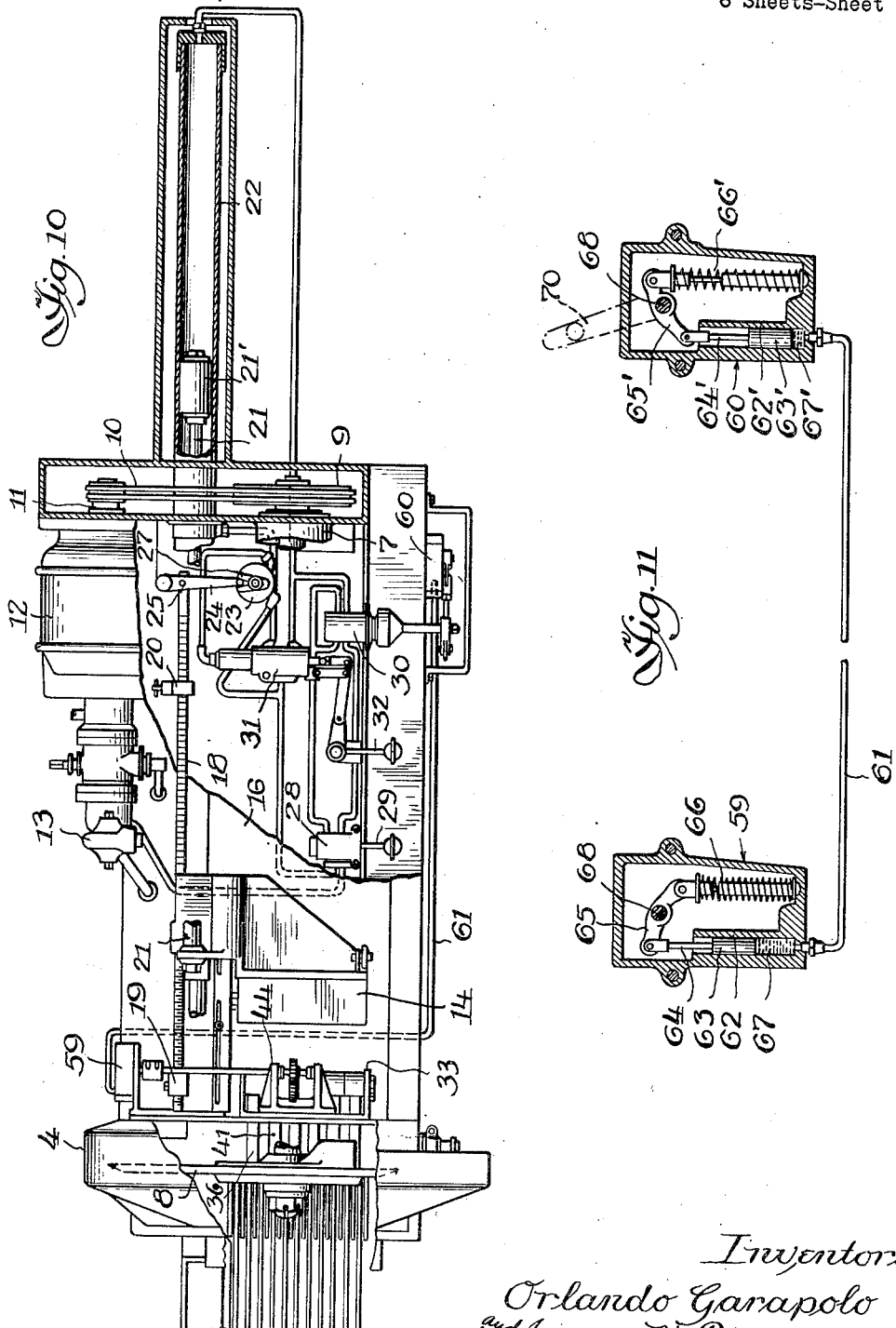

2,768,666

AUTOMATIC SLICE THICKNESS CONTROL FOR BACON SLICING MACHINE

Orlando Garapolo and James V. Dornan, Chicago, Ill., assignors to Wilson & Co., Inc., a corporation of Delaware Application October 2, 1953, Serial No. 383,843

15 Claims. (Cl. 146—95)

This invention relates to an automatic slice thickness control for a bacon slicing machine.

This application is a continuation-in-part of our prior application Serial No. 322,692, filed November 26, 1952, now abandoned.

It is customary to sell sliced bacon in packages of uniform weight, such as one pound or one-half pound packages. One of the problems in packaging sliced bacon arises from the variation in weight between slices, even when cut from the same slab. If the number of slices per pound varies, the consumer often feels cheated when the package does not contain as many slices as some other package, even though the total weight of the contents of each package is the same. Uniformity in the weight of individual slices of bacon is desirable, not only because of the more desirable appearance of the package, but also because such uniformity speeds up the weighing operation by the operator packaging the sliced bacon.

In slicing bacon, the conventional procedure consists in placing a slab of bacon on a supporting table, engaging one end of the bacon with a movable carriage, and feeding the bacon toward the slicing blade by moving the carriage in the desired direction. The slicing blade is run at a fixed speed, and the thickness of the individual bacon slices depends upon the speed at which the carriage moves the bacon to the slicing blade. The speed of the carriage can be adjusted, but the adjustment can provide only approximate uniformity in the weight of the bacon slices because when the machine has been set for slices of a certain thickness, it remains at that setting, and all slices are of the same thickness regardless of the thickness of the slab. The slices from a thick slab will weigh more than the slices from a thin slab, and the number of slices in a package of specified weight will vary.

Bacon is graded according to the thickness and width of the slab. Generally slabs having a thickness of from one to two inches, and a width of from seven to eight and one-half inches are considered to be best. However, even with the variations noted above, which are permitted in top quality bacon, the number of slices per pound may vary from 15 to 28 if the slices are cut of uniform thickness. Setting the machine for each slab of bacon does not solve the problem of providing a uniform number of slices per pound, because the individual slabs vary in thickness, being thicker at the shoulder than at the flank. Adjustment of the machine cannot be effectively accomplished while the machine is in operation by means hitherto known, because such adjustment would delay the slicing operation to such an extent that it is impracticable.

In accordance with the present invention we have incorporated into an otherwise conventional bacon slicing machine (such as, for example, The Anco Bacon Slicer No. 827 described on page 34 of Sausage Catalog No. 64A published by Allbright-Nell Company of Chicago in 1948) automatic means for regulating the speed of the carriage means for feeding the slab of bacon to the slicing blade, so that when a thick slab, or a thick portion of a slab, is being sliced, the feed will be slower than when a thin slab is sliced. It is apparent that if packages of uniform weight are to have the same number of slices the individual slices from thick slabs must be thinner than the slices from thin slabs because of the difference in the cross sectional area of the surface across which the slab is sliced.

The present invention comprises means for automatically varying the speed of the carriage during the actual slicing operation. The carriage feeding the bacon to the slicing machine is moved by a hydraulic system which operates a piston having a rod connected to the carriage. The speed of the carriage is controlled by a valve which regulates the flow of fluid into the cylinder. The valve may be operated manually, but with manual operation it is impossible to synchronize the changes in the speed of the carriage with the variations in the thickness of the slab being cut to attain the desired uniformity in the number of slices of bacon per pound. The structure herein disclosed includes means for automatically regulating the flow control valve so that the speed of the carriage will be changed instantly in response to each variation in thickness of the slab being cut. This instantaneous adjustment of the speed of the carriage is accomplished by either mechanical or hydraulic means. In both embodiments of the invention a spring pressed pivotally movable finger engages the top surface of the slab being cut, and transmits the vertical motion imparted to it, by changes in the thickness of the slab, to mechanism adapted to move the valve in accordance with such changes. The mechanical means for adjusting the speed of the carriage comprises a plurality of links interconnecting the pivotally movable finger and the flow control valve. The hydraulic means comprises a transmitter cylinder and a receiving cylinder such as described, for example, in the United States patent to Hele-Shaw and Beacham No. 1,983,884.

The structure by which the above and other advantages of the invention are attained will be described in the following specification, taken in conjunction with the accompanying drawings, showing two preferred illustrative embodiments of the invention, in which:

Fig. 1 is a side elevational view of a bacon slicing machine embodying the invention, looking at the machine from the operator's side, showing mechanical means for adjusting the speed of the carriage;

Fig. 2 is a top plan view of the bacon slicing machine, with parts broken away to clarify the illustration;

Fig. 3 is a fragmentary top plan view of a portion of the machine showing the flow control valve and the linkage connecting it to the pivotally movable finger;

Fig. 4 is an enlarged fragmentary perspective view showing the linkage connecting the flow control valve to the pivotally movable finger;

Fig. 5 is a fragmentary cross sectional view, taken substantially along the line 5—5 of Fig. 4, showing the pivotally movable finger and the gearing associated therewith for transmitting vertical motion from the finger to a horizontal shaft which may be operatively connected to either mechanical or hydraulic means for operating the flow control valve;

Fig. 6 is a fragmentary cross sectional view, taken substantially along the line 6—6 of Fig. 4, showing the pivotally movable finger and the spring which holds it against the top of the slab of bacon being cut;

Fig. 7 is a fragmentary view, partly in elevation and partly in section, showing the means for transmitting the vertical movement of the pivotally movable finger to a rotatable shaft on which is mounted the first link of the linkage that operates the flow control valve;

Fig. 8 is a fragmentary detail view, partly in section, showing the hydraulic transmitting cylinder of the hydraulic system which replaces the mechanical linkage for operating the flow control valve in the second embodiment of the invention;

Fig. 9 is a view, similar to Fig. 1, showing the hydraulic means for operating the flow control valve;

Fig. 10 is a view, similar to Fig. 2, diagrammatically showing the hydraulic system for moving the carriage and the hydraulic means for operating the flow control valve; and Fig. 11 is a diagrammatic view, partly in section, showing the transmitting and receiving valves of the hydraulic mechanism by means of which variations in the thickness of the slab being sliced are translated into adjustments of the speed control on the carraige moving mechanism of the slicing machine.

In the drawings, the bacon slicing machine comprises a base 2 upon which upstanding end members 3 and 4 are mounted. End members 3 and 4 are provided respectively with bearings 5 and 6 in which opposite ends of a rotatable shaft 7 are mounted. A slicing blade 8 is mounted on one end of shaft 7 and is housed in end member 4. The other end of shaft 7 carries a pulley 9 which is rotated by a belt 10 extending around the pulley and a driving shaft 11 rotated by a motor 12. The motor 12 also operates a pump 13 which forces fluid through the hydraulic system to control the reciprocatory movement of a carriage 14.

The slab of bacon 15 to be sliced is positioned on a receiving table 16. The carriage 14 is mounted on a guide rod 17 and a control rod 18 is provided, on which stop members 19 and 20 are mounted to limit the longitudinal movement of the carriage which pushes the slab of bacon in front of it. The control rod 18 has a limited movement, for the purpose hereinafter set forth. The carriage is connected to a piston rod 21 by means of which it is reciprocated.

The piston rod 21 is connected to a piston 21' (Fig. 10) mounted in a cylinder 22. The direction of movement of the piston rod 21 is controlled by a rotary pivot valve 23. A bell crank or lever 24 is pivoted to control rod 18, as indicated at 25, and has one end 26 positioned to engage a projection, such as arms 27, secured to valve 23 so as to reverse the valve every time bell crank 24 is moved about pivot 25. Engagement of carriage 14 with either stop member 19 or 20 causes a longitudinal movement of rod 18, which in turn, causes pivotal movement of lever 24 and thus operates valve 23 and reverses the movement of the carriage.

The hydraulic system for moving the carriage 14 is conventional, and will not be described in detail. It includes a two-way valve 28 controlled by a lever 29 to start and stop the flow of hydraulic fluid through the system, a flow control valve 30 which is adjusted to control the rate of flow, and a four-way valve 31, controlled by a lever 32, to increase the speed of the forward and rearward movement of the carriage. The lines interconnecting the various valves, pump, and the tank of the hydraulic cylinder are shown in Fig. 2. In Fig. 2 the open pair of lines leads to the valve 30 and the open vertical line at the center leads to the fluid tank, neither of which is shown in this figure. The open horizontal line at the right hand side leads to the end of cylinder 22. The present invention is primarily concerned with means to automatically operate the valve 30, which regulates the forward speed of the carrier 14, in response to variations in thickness of the slabs of bacon being fed to the slicing blade 8 by the carriage 14. Whenever the thickness of the slab decreases, the flow control valve 30 is opened wider to speed up the feed of carriage 14, and thereby increases the thickness of the individual slices of bacon being cut at that particular instant. Whenever the slab of bacon being sliced becomes thicker, the valve 30 is moved towards closed position to slow down the feed of carriage 14 and decreases the thickness of the slices of bacon.

End member 4 is provided with a bracket 33 in which a rod 34 is rigidly mounted. A plurality of sleeves 35 and one sleeve 40 are rotatably mounted on rod 34 (see Fig. 7). Each sleeve 35 has an outwardly projecting finger 36 integral therewith (see Fig. 6). A spiral spring 37 is mounted in each sleeve 35 and has one end 38 rigidly held in a slot 39 in the sleeve and its other end similarly held in a slot 39' in rod 34. The springs 37 exert constant force against the fingers 36, urging them downwardly against the slab of bacon being fed to the slicing blade.

The sleeve 40, which is rotatably mounted on rod 34 between two of the sleeves 35 is provided with a finger 41 which is pressed downwardly by a spring 37 and differs from the fingers 36 only in that it controls the automatic adjusting means regulating the speed of the feed of carriage 14. A filler block 42 is rigidly secured in sleeve 40 and has a segmental gear 43 rigidly secured thereto. A bracket 44, mounted on bracket 33, rotatably supports a pair of vertically spaced shafts 45 and 46, each of which is provided with suitable bearings 45' and 46', respectively. A gear 47, keyed to shaft 45 as indicated at 47', meshes with segmental gear 43 and with another gear 48 keyed to shaft 46 as indicated at 48'.

The spring pressed finger 41 rests on top of the slab of bacon being sliced and is urged downwardly by the spring 37 in sleeve 40. Finger 41 is positioned as close to cutting blade 8 as possible, since it is the thickness of the bacon slab adjacent the cutting blade that is important in controlling the thickness of the slices. Finger 41 moves up or down in conformity with the thickness of the portion of the bacon slab with which it is in contact. An upward movement of finger 41 rotates sleeve 40 and segmental gear 43 about rod 34 in one direction, and a downward movement rotates them in the opposite direction. This rotation of gear 43 is transmitted to shaft 46 through gears 47 and 48. By varying the sizes of gears 47 and 48, the extent of the angular movement of shaft 46 resulting from the vertical movement of finger 41 may be varied as desired.

As shown in Fig. 4, flow control valve 30 is mounted on a supporting wall 49 projecting forwardly from a bracket 50 secured to bracket 33. An arm 51, projecting forwardly from bracket 50 in parallel spaced relationship to the wall 49, supports one end of shaft 46. Shaft 46 is operatively connected to flow control valve 30 by a linkage comprising a link 52 rigidly mounted on shaft 46, a link 53 engaging the valve 30, and an intermediate adjustable link 54 pivotally secured at one end to link 52 and at its other end to link 53. Intermediate link 54 is adjustable in length, as indicated at 55 (Fig. 4), and screw 53', which secures intermediate link 54 to link 53 extends through a longitudinal slot 56 provided in link 53. Slot 56 permits the end of intermediate link 54 to be secured to link 53 anywhere along the length of the slot to vary the effective length of link 53, so that the rotational movement of valve 30 relative to the rotational amount of movement of shaft 46 may be adjusted within certain limits. When the portion of the bacon slab adjacent the cutting knife is thicker than the portion engaged by the knife it will raise finger 41, causing link 53 to move towards the left, as seen in Fig. 4, and link 53 will move valve 30 towards fully open position to increase the flow of fluid in the hydraulic system, thus speeding the movement of carriage 14. When the thickness of the bacon slab being cut decreases, finger 41 moves downwardly and slows the travel of carriage 14. A spring 57 is connected at one end to link 53 and its other end to a screw 58 or stud projecting laterally from wall 49 to cooperate with spring 37 in urging finger 41 downwardly against the top of the bacon slab being sliced.

In the embodiment of the invention illustrated in Figs. 8 to 11, the structure is essentially the same as hereinabove described, except that a hydraulic system replaces the linkage 52, 53, 54 for interconnecting the end of shaft 46 and flow control valve 30. In the drawings the same reference numerals indicate identical structure.

The hydraulic system for interconnecting shaft 46 and valve 30 comprises a transmitter housing 59 mounted on end member 4, a receiver housing 60 mounted on base 2 adjacent flow control valve 30, and a length of tubing 61 connecting the bottom of housing 59 and the bottom of housing 60. Valve 30 is positioned adjacent the opposite end of the machine in this embodiment for greater convenience in connecting it to the hydraulic system for moving carriage 14, but its structure and mode of operation is the same in both embodiments.

As shown in Fig. 11 the transmitter housing 59 contains a cylinder 62, a piston 63 in the cylinder, and a piston rod 64 connected at one end to the piston and at the other end to a crank arm 65. A spring assembly 66 is connected to the other end of the crank arm and is adapted to force the piston down when the pressure of fluid 67 against the piston is relieved. The transmitter and receiver units are essentially alike and differ from each other only in the means for connecting them to the mechanism outside the housings. The parts in the receiver unit are designated by the same numbers as the corresponding parts in the transmitter unit, with a prime.

A pivot pin 68, rigidly secured to the crank arm 65, extends through housing 59 into a sleeve 69 (Fig. 8) into which the end of shaft 46 also extends. The sleeve 69 is rigidly secured to the ends of the shaft 46 and of pin 68 by set screws 69' so that rotation of shaft 46 in either direction rotates pin 68. If the direction of movement of shaft 46 is such as to move piston 63 downwardly, the fluid 67 moving through tube 61 will force the piston 63' in the receiving unit upwardly. If shaft 46 is rotated to move piston 63 upwardly the pressure of fluid 67 against piston 63' is relieved, and spring assembly 66' will move piston 63' downwardly. In each instance the movement of the piston 63' will exactly equal the movement of the piston 63 in the opposite direction, and corresponding movement will be imparted to the pivot pin 68' in the receiver unit.

As shown most clearly in Fig. 9, the pin 68' is keyed to a lever 70 and a link 71 connects lever 70 to another lever 72 which controls the opening and closing movements of the flow control valve 30. Movement of the lever 70 towards the right, as viewed in Fig. 9, moves the valve 30 towards closing position and thereby restricts the flow of fluid therethrough. Such restriction of the flow of fluid through valve 30 slows the travel of carriage 14. Movement of the lever 70 in the opposite direction increases the flow of fluid through valve 30 and speeds the travel of carriage 14.

From the foregoing it may be seen that the vertical movement of finger 41, in response to changes in the thickness of the slab of bacon on which it rests, is automatically transmitted, either through linkage 52, 53, 54 or through cylinders 50 and 50', to the flow control valve 30, and the speed of the feed of the slab of bacon being sliced is varied accurately and instantaneously so that if the slicer is set to produce, for example, 20 slices of bacon per pound, the number of slices will not vary, despite variations in the thickness of the slabs of bacon which are sliced.

Although the present invention has been described with particular reference to a bacon slicing machine, it will be obvious that the means to control the rate of speed of the carriage may be used with other machines of similar nature. The description, while limited to two preferred embodiments of the invention, is intended to be illustrative, rather than restrictive, as many details may be modified or changed without departing from the scope of the appended claims. Accordingly, we do not desire to be restricted to the exact structure described.

We claim:

1. In a meat slicing machine having hydraulic means for feeding the meat to be sliced and a flow control valve for controlling the rate of feed of said meat, a member engaging the top surface of the meat being sliced, said member being moved vertically in accordance with variations in the thickness of said meat as said meat passes below said member, and means operatively connected to said member and said flow control valve to vary the rate of movement of said feeding means and thereby vary the thickness of the individual slices of meat in response to vertical movement of said member.

2. In a meat slicing machine, a slicing blade, a carriage movable longitudinally of said machine for feeding a slab of meat to said slicing blade, a finger positioned forwardly of said slicing blade and pressed against the top surface of the slab of meat being fed to said slicing blade, and means operatively connected to said finger and to said carriage to vary the rate of movement of said carriage and thereby vary the thickness of the individual slices of meat in response to vertical movement of said finger.

3. In a meat slicing machine, a slicing blade rotatable at a constant rate, a carriage movable longitudinally of said machine for feeding a slab of meat to said slicing blade, a spring pressed finger positioned forwardly of said slicing blade and engaging the top surface of the slab of meat being fed to said slicing blade, and means operatively connected to said finger and to said carriage to vary the rate of movement of said carriage and thereby vary the thickness of the individual slices of meat in response to vertical movement of said finger.

4. In a meat slicing machine, a slicing blade, a carriage movable longitudinally of said machine for feeding a slab of meat to said slicing blade, hydraulic means for moving said carriage, said hydraulic means including a flow control valve, a finger engaging the top surface of the slab of meat being fed to said slicing blade and movable vertically in response to variations in the thickness of said slab of meat, and means operatively connected to said finger and to said flow control valve to vary the rate of movement of said carriage and thereby vary the thickness of the individual slices of meat in response to vertical movement of said finger.

5. In a meat slicing machine, a slicing blade, a hydraulic system for feeding a slab of meat to said slicing blade, said system including a flow control valve for controlling the rate of feed of the slab, a finger positioned adjacent said slicing blade in engagement with the top surface of a slab of meat being cut by said slicing blade and movable vertically in response to variations in the thickness of said slab of meat, and means operatively connected to said finger and to said flow control valve to vary the rate of movement of said feeding means and thereby vary the thickness of the individual slices of meat in response to vertical movement of said finger.

6. In a meat slicing machine, a slicing blade, means for feeding a slab of meat to said slicing blade, hydraulic means for moving said feeding means longitudinally of said machine, a flow control valve for controlling the rate of movement of said feeding means, a finger engaging the top surface of a slab of meat being fed to said slicing blade, said finger moving vertically in response to variations in thickness of said slab of meat as said slab passes below said finger, and means operatively connected to said finger and to said flow control valve to vary the rate of movement of said feeding means and thereby vary the thickness of the individual slices of meat in response to vertical movement of said finger.

7. In a meat slicing machine, a slicing blade, means for feeding a slab of meat to said slicing blade, hydraulic means for moving said feeding means longitudinally of said machine, a flow control valve for controlling the rate of movement of said feeding means, a finger engaging the top surface of a slab of meat being fed to said slicing blade, said finger moving vertically in response to variations in thickness of said slab of meat as said slab passes below said finger, and mechanical linkage operatively connected to said finger and to said flow control valve to vary the rate of movement of said feeding means in response to vertical movement of said finger.

8. In a meat slicing machine, a slicing blade, means for feeding a slab of meat to said slicing blade, hydraulic means for moving said feeding means longitudinally of said machine, a flow control valve for controlling the rate of movement of said feeding means, a finger rigidly secured to a shaft and engaging the top surface of a slab of meat being fed to said slicing blade, said finger moving vertically to rotate said shaft in response to variations in thickness of said slab of meat as said slab passes below said finger, and mechanical linkage operatively connected to said shaft and to said flow control valve to vary the rate of movement of said feeding means in response to vertical movement of said finger.

9. In a meat slicing machine, a slicing blade, means for feeding a slab of meat to said blade, a plurality of spring pressed fingers pressed against the top surface of a slab of meat being fed to said slicing blade, a gear operatively connected to one of said fingers to rotate with vertical movement of said one finger, a rotatable shaft, a gear mounted on said rotatable shaft and operatively connected to said first mentioned gear, said shaft being operatively connected to a mechanical linkage, and a means controlling the rate of feed of said feeding means, said mechanical linkage being operatively connected to said feed rate controlling means, whereby vertical movement of said finger moves said feed rate control means in accordance with the direction of said vertical movement.

10. In a meat slicing machine having hydraulic means for feeding the meat to be sliced and a flow control valve for controlling the rate of feed of said meat, hydraulic means for operating said valve automatically, said hydraulic means comprising a pair of cylinders, each of said cylinders having a piston mounted therein, a tube connected between said cylinder and cooperating therewith to maintain a fixed amount of fluid between said pistons, one of said cylinders being operatively connected to said valve and the other of said cylinders being operatively connected to a rotatable shaft, and a spring pressed finger riding over the top surface of the meat being sliced, said finger being operatively connected to said shaft to rotate it in opposite directions as said finger is moved vertically in opposite directions by variations in thickness of the meat being sliced, the rotation of said shaft being effective to move the piston of the cylinder to which said shaft is operatively connected and thereby cause an equal movement of said other piston to move said flow control valve a predetermined amount in response to the vertical movement of said finger, and thereby vary the rate of feed of the meat being sliced.

11. In a meat slicing machine, a slicing blade, a carriage for feeding a slab of meat to said blade, a spring pressed finger engaging the top surface of the slab of meat being fed to said blade, said finger being moved vertically in response to variations in the height of the top surface of said slab of meat, said finger being mounted on a rod and effective to rotate said rod as it is moved vertically, a shaft, a plurality of gears connecting said shaft to said rod, whereby said shaft is rotated as said finger moves vertically, a cylinder provided with a piston connected through a piston rod to one end of a crank arm, said shaft being operatively connected to said crank arm to move said piston vertically as said finger moves vertically, a second cylinder provided with a piston connected through a piston rod to one end of a crank arm, a tube connecting said cylinders and maintaining a constant supply of fluid between said pistons, a lever operatively connected to said second mentioned crank arm, and means for controlling the rate of feed of said slab of meat to said slicing blade, said lever being operatively connected to said feed rate control means to vary the rate of feed of said carriage in response to vertical movement of said finger.

12. In a meat slicing machine, a slicing blade rotatable at a constant speed, a carriage for feeding a slab of meat to said slicing blade, hydraulic means including a flow control valve for controlling the rate of feed of said carriage, a spring pressed finger bearing against the slab of meat being fed to said slicing blade, said finger being moved vertically in response to variations in the thickness of the slab of meat being fed to the slicing blade, and hydraulic means operatively connected at one end to said finger and at the other end to said flow control valve, said hydraulic means being effective to transmit vertical movement of said finger to said flow control valve to increase the opening of said valve during the downward movement of said finger, and to diminish the opening of said valve during the upward movement of the finger, thereby speeding up the feeding of thinner portions of said slab of meat to said slicing blade and slowing down the feeding of thicker portions of said slab of meat to said slicing blade.

13. In a meat slicing machine, a slicing blade, means for feeding a slab of meat to said blade, a plurality of spring pressed fingers pressed against the top surface of a slab of meat being fed to said slicing blade, a gear operatively connected to one of said fingers to rotate with vertical movement of said one finger, a rotatable shaft, a gear mounted on said rotatable shaft and operatively connected to said first mentioned gear, said shaft being operatively connected to a transmitter cylinder, a receiving cylinder connected to said transmitter cylinder whereby movement in said transmitter cylinder is reproduced in said receiving cylinder, a means controlling the rate of feed of said feeding means, and means operatively connecting said receiving cylinder to said feed rate controlling means, whereby vertical movement of said finger moves said feed rate control means in accordance with the direction of said vertical movement.

14. In a meat slicing machine, a slicing blade rotatable at a constant rate, means for feeding a slab of meat to said slicing blade, a spring pressed finger pressed against the top surface of the slab of meat being fed to said slicing blade, means for controlling the rate of feed of said feeding means, and a pair of interconnected hydraulic cylinders operatively connected to said finger and said feed rate controlling means to vary the rate of feed of said feeding means in response to vertical movement of said finger.

15. In a meat slicing machine, a slicing blade, a hydraulic system for feeding a slab of meat to said slicing blade, said system including a flow control valve for controlling the rate of feed of the slab, a finger engaging the top surface of the slab of meat being fed to said slicing blade, said finger being movable vertically in response to variations in the thickness of said slab of meat, and a separate hydraulic system operatively connected to said finger and said valve, whereby vertical movement of said finger is effective to operate said valve to vary the rate of feed of said slab of meat.

References Cited in the file of this patent

UNITED STATES PATENTS

| | | |
|---|---|---|
| 2,332,084 | Jensen | Oct. 19, 1943 |
| 2,463,157 | Deitrickson | Mar. 1, 1949 |
| 2,642,910 | Garapolo | June 22, 1953 |